United States Patent
Yoshioka

(10) Patent No.: US 6,186,405 B1
(45) Date of Patent: *Feb. 13, 2001

(54) DOT CODE AND CODE READING APPARATUS

(75) Inventor: Kenji Yoshioka, Hachioji (JP)

(73) Assignee: Olympus Optical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/035,544

(22) Filed: Mar. 5, 1998

(30) Foreign Application Priority Data

Mar. 24, 1997 (JP) ........................................ 9-087258
Jan. 6, 1998 (JP) ........................................ 10-000896

(51) Int. Cl.⁷ .................................................. G06K 19/06
(52) U.S. Cl. .................. 235/494; 235/456; 235/462.09; 714/768
(58) Field of Search ........................... 235/454, 456, 235/494, 462.08, 462.09, 460, 487; 714/752, 763, 764, 765, 767, 768, 805, 53

(56) References Cited

U.S. PATENT DOCUMENTS

| | | | |
|---|---|---|---|
| 4,263,504 | * | 4/1981 | Thomas ................................ 235/454 |
| 5,051,736 | * | 9/1991 | Bennett et al. ........................ 340/707 |
| 5,128,525 | * | 7/1992 | Stearns et al. ........................ 235/454 |
| 5,204,515 | * | 4/1993 | Yoshida ................................ 235/456 |
| 5,343,031 | * | 8/1994 | Yoshida ................................ 235/494 |
| 5,410,620 | * | 4/1995 | Yoshida ............................... 235/44 X |
| 5,644,557 | * | 7/1997 | Akamine et al. ....................... 369/14 |
| 5,754,687 | * | 5/1998 | Fujimori et al. ...................... 382/190 |
| 5,767,494 | * | 6/1998 | Matsueda et al. ..................... 235/454 |
| 5,774,583 | * | 6/1998 | Sasaki et al. ......................... 382/190 |
| 5,835,629 | * | 11/1998 | Seo ..................................... 382/173 |
| 5,896,403 | * | 4/1999 | Nagasaki et al. ..................... 714/752 |
| 5,898,166 | * | 4/1999 | Fukuda et al. ........................ 235/494 |

FOREIGN PATENT DOCUMENTS

| | | |
|---|---|---|
| 0 388 204 | 9/1990 | (EP) . |
| 0 670 555 | 9/1995 | (EP) . |
| 0 672 994 A1 | 9/1995 | (EP) . |
| WO 81/00476 | 2/1981 | (WO) . |

* cited by examiner

*Primary Examiner*—Michael G Lee
*Assistant Examiner*—Diane I. Lee
(74) *Attorney, Agent, or Firm*—Frishauf, Holtz, Goodman, Langer & Chick, P.C.

(57) ABSTRACT

A dot code is provided for recording digital data, such as multi-media information, as an optically readable code pattern, using various modulation methods, and a code reading apparatus is provided for restoring modulated information recorded as the dot code. The dot code includes a plurality of blocks. Each block has a marker section for recognizing the block, a data dot pattern section which is modulated to be structurally discriminated from the marker section and to represent modulated information, and a block header section as a non-modulation area which contains block address data. The block header section stores restoration parameter data necessary to restore the modulated information, thereby enabling the dot code to be variously modulated.

7 Claims, 5 Drawing Sheets

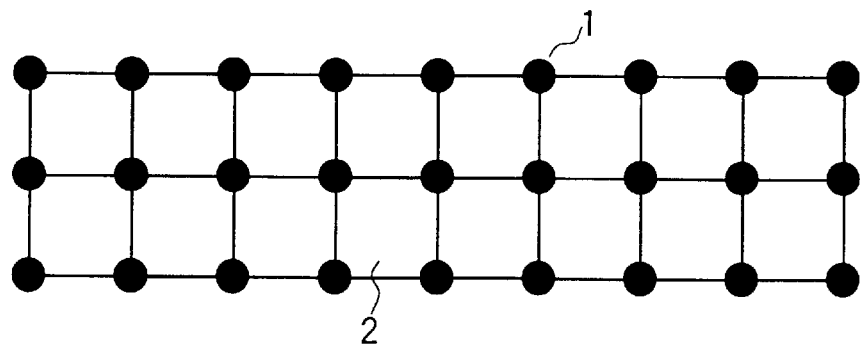
FIG. 1A
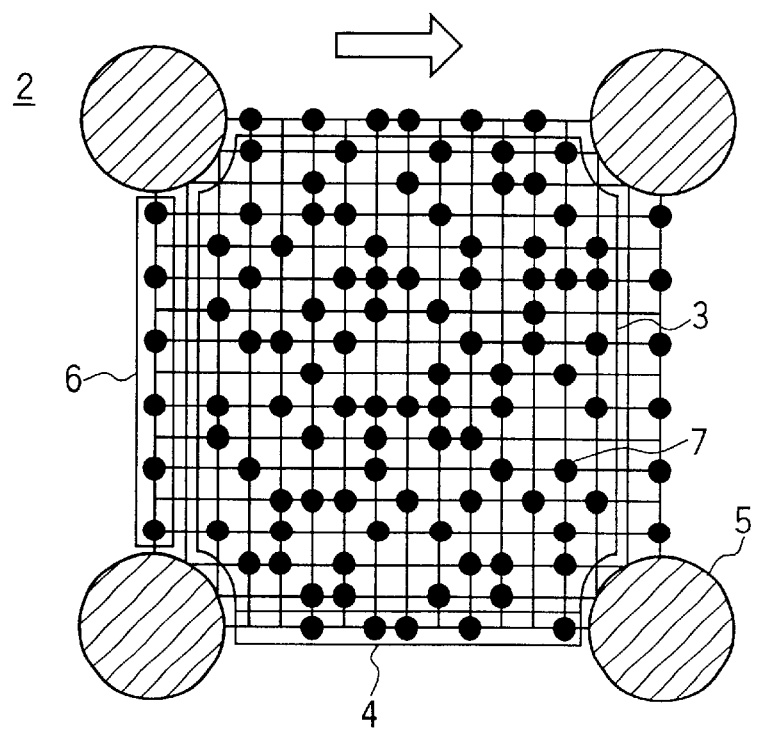
FIG. 1B
| 10 | 9 | 8 | 7 | 6 | 5 | 4 | 3 | 2 | 1 | 0 |
|---|---|---|---|---|---|---|---|---|---|---|
| 0 | 0 | 1 | 0 | 1 | 1 | 0 | 1 | 0 | 0 | 1 |
FIG. 1C

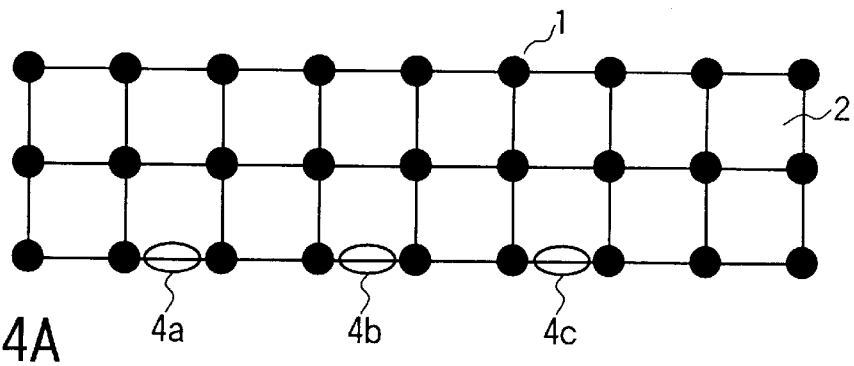
FIG. 4A
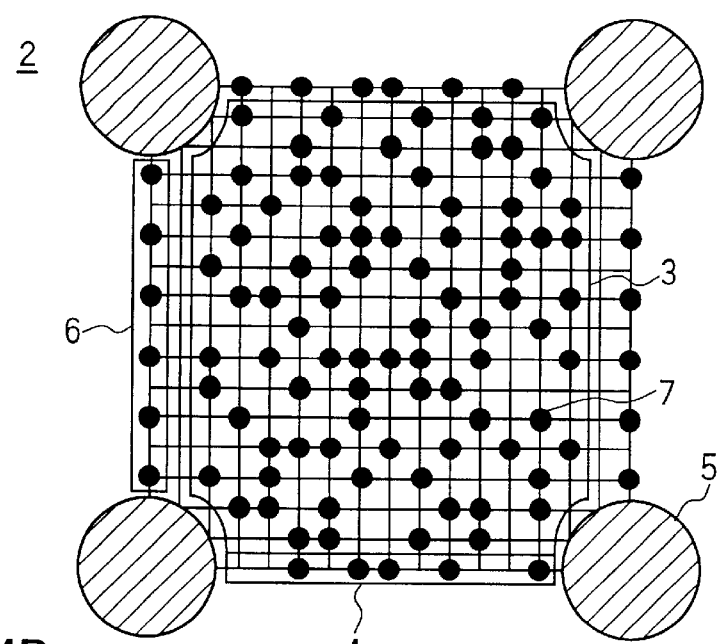
FIG. 4B
| 4 | 20 | | | | 23 | | | | | | |
|---|----|----|---|---|----|---|---|---|---|---|---|
| | 10 | 9 | 8 | 7 | 6 | 5 | 4 | 3 | 2 | 1 | 0 |
| 4a | 0 | 1 | 0 | 0 | 1 | 1 | 0 | 1 | 0 | 0 | 1 |
23a
| | 10 | 9 | 8 | 7 | 6 | 5 | 4 | 3 | 2 | 1 | 0 |
|---|----|----|---|---|---|---|---|---|---|---|---|
| 4b | 1 | 0 | 0 | 0 | 1 | 1 | 0 | 1 | 0 | 0 | 1 |
23b
| | 10 | 9 | 8 | 7 | 6 | 5 | 4 | 3 | 2 | 1 | 0 |
|---|----|----|---|---|---|---|---|---|---|---|---|
| 4c | 1 | 1 | 0 | 0 | 1 | 1 | 1 | 0 | 0 | 0 | 1 |
23c
FIG. 4C

DOT CODE AND CODE READING APPARATUS

BACKGROUND OF THE INVENTION

This invention relates to a recording medium, such as a paper sheet, with a dot code recorded thereon as a code pattern, from which code so-called multi-media information including voice information, image information, digital code data, etc. can be optically read. The invention also relates to a code reading apparatus capable of reading the multi-media information recorded on the recording medium as the dot code.

A bar code system, for example, is now used in many cases to record digital information on a recording medium such as a paper sheet. Since the bar code system is a recording system of a one-dimensional arrangement, the amount of information included in a bar code is limited. Therefore, it cannot be said that the bar code system sufficiently meets the today's requirements for realizing an information recording medium of a high recording capacity.

EPO 670555A1 (corresponding to U.S. Ser. No. 08/407,018 now U.S. Pat. No. 5,896,403), for example, which was developed under the aforementioned circumstances and filed by the same applicant as the present application, discloses a technique for performing high-density recording, on e.g. a paper sheet, of so-called multi-media information of a large capacity which includes voice information, image information, digital data, etc. Specifically, this publication discloses a technique relating to an optically readable "dot code", which comprises two-dimensionally arranged fine dots and wherein whether or not each dot exists indicates one-bit information.

The dot code can have a plurality of blocks arranged adjacent to each other. Each block is characterized by including a data dot pattern which includes of a plurality dots arranged in accordance with the contents of multi-media information, a marker provided at a first predetermined location with respect to the data dot pattern and having a pattern which is not included in dot patterns, and a block address pattern provided at a second predetermined location with respect to the marker and indicative of the address of the block. The data dot pattern is modulated such that the number of sequentially arranged black dots is limited, whereby the image of the data dot pattern is discriminated from that of the marker.

Since dot codes have developed into commodities, it has become necessary to modulate them in various manners in accordance with the quality of paper on which the codes will be printed, with the kind of ink, or with the degree of reliability required for information to be recorded as the code.

The aforementioned EPO 670555A1 (corresponding to U.S. Ser. No. 08/407,018 now U.S. Pat. No. 5,896,403), however, does not disclose means for performing such various modulations.

Japanese Patent Application KOKAI Publication No. 7-254037 discloses a two-dimensional code created by arranging, in cell patterns, data represented as a binary code, and locating the cell patterns on a two-dimensional matrix. This publication describes that the dot code is subjected to predetermined modulation to form a pattern, which differs from, for example, the pattern of a positioning symbol set as a code pattern portion other than the pattern portion indicative of information. The publication also describes that information indicative of the kind of a matrix pattern used for the modulation is included in the two-dimensional code.

Since the information indicative of the kind of the matrix pattern is included in the data pattern to be modulated, a particular means is necessary to extract the information.

BRIEF SUMMARY OF THE INVENTION

The present invention has been developed under the above-described circumstances, and aims to provide a recording medium with a dot code as an optically readable code pattern, which represents information relating to multi-media information, and in which code the information can be modulated by various modulation methods. The invention also provides a code reading apparatus capable of restoring the modulated information recorded as the dot code.

According to one aspect of the invention, there is provided an optically readable dot code including a plurality of blocks arranged adjacent to each other, each block comprising: a marker section for recognizing the block; a data dot pattern section as a modulation area which is modulated to be structurally discriminated from the marker section and to represent modulated information, and which includes a plurality of dots arranged such that each bit value of the modulated information is represented by a corresponding dot; and a block header section as a non-modulation area which contains block address data indicative of an address assigned to the block; wherein the marker section, the data dot pattern and the block header section are in a predetermined arrangement; and the block header section includes restoration parameter data necessary to process modulated information represented by a data dot pattern in the data dot pattern section of the block, thereby to restore the modulated information to predetermined perceptible information.

According to another aspect of the invention, there is provided a code reading apparatus comprising: reading means for picking up and optically reading an image of a dot code including a plurality of blocks arranged adjacent to each other, each block at least having a block header section which includes block address data, and restoration parameter data necessary to process modulated information represented by a data dot pattern incorporated in the block, and then to restore the information to predetermined perceptible information; block header section extracting means for extracting the header block section from each block of the dot code read by the reading means; restoration means for processing the modulated information items of the blocks and combining them into predetermined perceptible information on the basis of the block address data and the restoration parameter data in the block header section of each block extracted by the block header section extracting means; and output means for outputting the predetermined perceptible information restored by the restoration means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1A is a view, showing a basic dot code recorded on a recording medium according to the invention;

FIG. 1B is a view, showing, in detail, each of blocks which constitute the dot code;

FIG. 1C is a view, showing information included in a block header section in the block;

FIG. 4A is a view, showing another basic dot code employed in the invention;

FIG. 4B is a view, showing, in detail, each of blocks which constitute the dot code of FIG. 4A;

FIG. 4C is a view, showing information included in a block header section in the block of FIG. 4B.

DETAILED DESCRIPTION OF THE INVENTION

Figure 2:
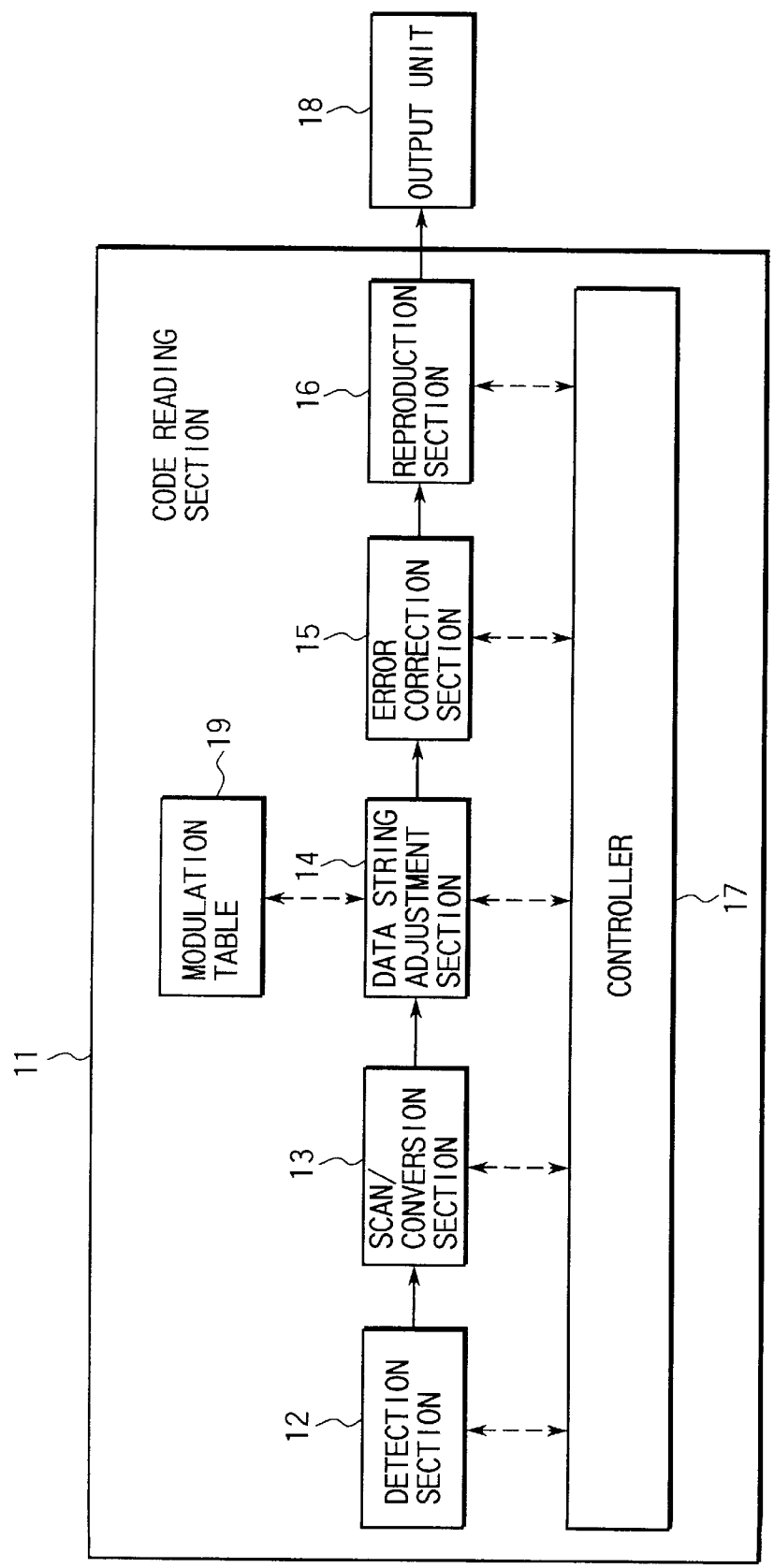
FIG. 2 is a block diagram, showing a code reading apparatus according to the invention.

The outline of a dot code and a code reading apparatus according to the invention will be explained before the embodiments of the invention will be described in detail.

Referring first to FIGS. 1A to 1C, the structure of a basic dot code employed in the invention will be described. As is shown in FIG. 1A, information relating to multi-media information is recorded, by printing, as an optically readable dot code 1 on a recording medium such as a paper sheet. The dot code 1 comprises a plurality of blocks 2 arranged in a two-dimensional matrix, each of which includes a predetermined number of dots. Each block 2 which consists of the predetermined number of dots is actually recognized to have a predetermined density.

FIG. 1B shows, in more detail, the structure of each of the blocks 2 which constitute the dot code 1. As is shown in FIG. 1B, each block 2 comprises a data dot pattern section 3 which represents modulated information and which includes a plurality of dots arranged such that each bit value of the modulated information is represented by a corresponding dot, and a block header section 4 provided at a predetermined location with respect to the data dot pattern 3 and indicative of information such as an address assigned to the block. In FIGS. 1A and 1B, the linear lines which connects the dots are imaginary ones.

Each block 2 further comprises markers 5 provided for its recognition at predetermined locations, for example, at its four corners, and a matching dot pattern section 6 located between those of the markers 5 which are adjacent to each other in, for example, a first direction. The block header section 4 is located between those of the markers 5 which are adjacent to each other in, for example, a second direction.

Data dots 7 provided in the matching dot pattern section 6, the block header section 4 and the data dot pattern section 3 have the same size. The marker 5 is a circular dot which has a larger (e.g. five times larger) diameter than the data dot 7.

Information relating to multi-media information is modulated before it is recorded as a data dot pattern, to limit the number of the data dots 7 continuously located in the vertical direction in FIG. 1B. This modulation is performed to enable optical discrimination of the data dots 7 from the markers 5. If the marker 5 has a five times larger diameter than the data dot 7, the number of the vertically continuous data dots 7 should be not more than 4. The modulation performed in this case is a 4–5 modulation in which 5-bit data is prepared by adding 1-bit redundancy data to 4-bit data, and a modulation table is selected so that the maximum number of continuous bits will not exceed four after modulation.

Although the block shown in FIG. 1B has a data dot lattice of (17 data dots×17 data dots), it is a matter of course that the invention is not limited to this size. The size may be (30 data dots×30 data dots) or (40 data dots×40 data dots).

FIG. 1C shows the contents of information included in the block header section 4. A black portion of the section 4, at which a dot exists, indicates data of "1", while a white portion of the section 4, at which no dot exists, indicates data of "0". The white portion is actually a ground color portion of the recording medium. Address data indicative of the address of the block 2, which is not modulated, is included in the block header section 4.

A method for reading the above-described dot code will now be described.

Images included in the dot code on the recording medium are sequentially picked up by moving the code reading apparatus in a direction indicated by the arrow in FIG. 1B. At the time of reading the dot code images, a marker which is considered a reference position is detected to accurately detect the position of each dot from each image picked by, for example, a CCD over a plurality of frames, and then the data dot pattern section 3 of the block 2 is read. The detection of the marker is performed using the feature that it has a larger size than the dots. Thereafter, the matching dot pattern section 6 located between the adjacent markers is searched, and the coordinates of the center of each dot included in the section 6 are determined. From the determined coordinates of the center of each dot, a reading reference point and a reading point of each dot in the data dot pattern section 3 are obtained, using, for example, the least square method. For particulars on the reading method, see Japanese Patent Application KOKAI Publication No. 8-171620 previously filed by the same applicant as the present application.

FIG. 2 shows function blocks incorporated in the code reading apparatus. The code reading apparatus is adapted to read the data dots 7 of the dot code 1, convert the read dots into predetermined readable binary data, and output it.

As is shown in FIG. 2, a code reading apparatus 11 comprises a detection section 12 for picking images of the dot code shown in FIG. 1A and recorded, by printing, on a recording medium such as a paper sheet, a scan conversion section 13 for recognizing, as a dot code image, image data from the detection section 12 to normalize it, a data string adjustment section 14 for adjusting the data string or performing demodulation processing with reference to a modulation table 19, an error correction section 15 for correcting a reading error or data error during data reproduction, a reproduction section 16 for expanding data compressed in accordance with its properties, a controller 17 for controlling each section, and an output unit 18 such as a speaker, monitor, etc. for outputting multi-media information.

For particulars on the detection section 12, the scan conversion section 13, the data string adjustment section 14, the error correction section 15, the reproduction section 16 and the voice output unit 18, see Japanese Patent Application KOKAI Publication No. 6-231466 previously filed by the same applicant as the present application.

The above-explained recording medium with the dot code and the above-explained code reading apparatus according to the present invention will be described in more detail.

First, a dot code according to a first embodiment will be described.

This dot code relates to a dot code which includes restoration parameter data in the block header section, or includes modulated data in the restoration parameter data.

Figure 3A:
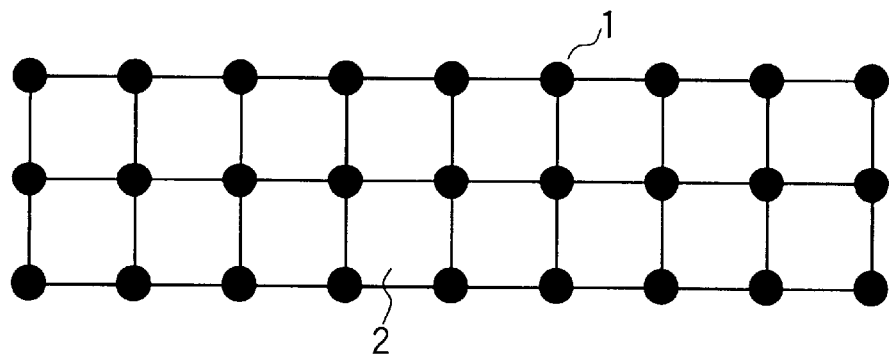
FIG. 3A is a view, showing a dot code employed in the invention.
Figure 3B:
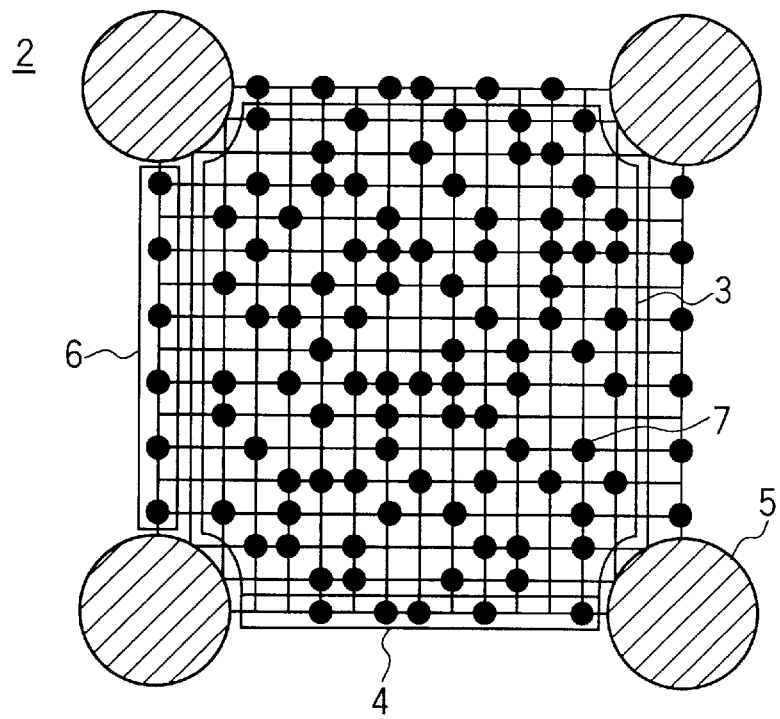
FIG. 3B is a view, showing, in detail, each of blocks which constitute the dot code of FIG. 3A.
Figure 3C:
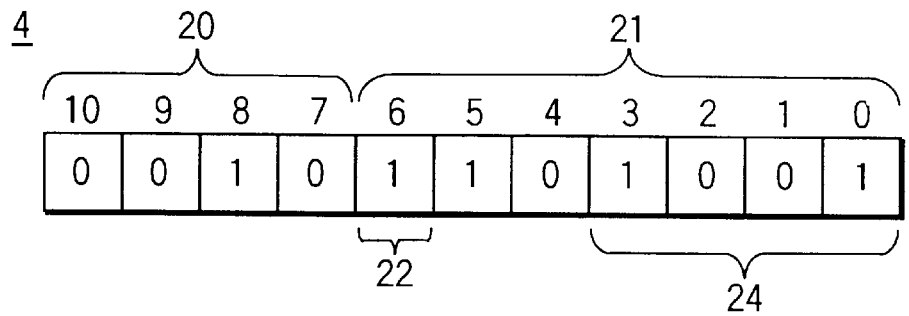
FIG. 3C is a view, showing information included in a block header section in the block of FIG. 3B.

FIGS. 3A to 3C show the structure of a dot code recorded on a recording medium according to the first embodiment.

As is shown in FIG. 3A, a dot code 1 comprises a plurality of blocks 2 arranged two-dimensionally and adjacent to one another. As is shown in FIG. 3B, each block 2 comprises marker sections 5 for recognizing the block 2; a data dot pattern section 3 as a modulation area which is modulated to be structurally discriminated from the marker sections 5 and to represent modulated information, and which includes a plurality of data dots 7 arranged such that each bit value of the modulated information is represented by a corresponding dot; a block header section 4 as a non-modulation area which contains block address data indicative of the address of the block 2, and a matching dot pattern section 6.

This embodiment has restoration parameter data 21 in the block header section 4, as is shown in FIG. 3C. The restoration parameter data 21 is necessary when information modulated on the basis of the data dot pattern which is included in each block 2 is processed to restore predetermined perceptible information. Thus, the restoration parameter data 21 enables restoration of modulated information to original one.

As the restoration parameter data 21 for restoring the modulated information to the original one, is used, for example, data relating to an error correction code or an error correction code length, data relating to the number of blocks 2 included in the dot code 1, data relating to copy protect, or interleave data relating to the data dot pattern included in the modulation area, as well as the data indicative of a modulation method applied to the data dot pattern section 3. These data items are recorded when they are necessary.

There is no particular limitation to the modulation method, and hence various methods can be employed. It is a matter of course that restoration processing can be performed easily by any voluntary modulation method if modulation method data items 22 corresponding to various modulation methods are included in the restoration parameter data 21.

As described above, the dot code on the recording medium according to the first embodiment has unmodulated block address data 20 and unmodulated restoration parameter data 21 in the block header section 4. Accordingly, the modulation processing will cause no redundancy data in the data included in the block header section 4, which means that all data dots in the block header section 4 can be assigned to the address data 20 and the restoration parameter data 21.

Since in the invention, in particular, the restoration parameter data 21, which is not modulated, is included in the block header section 4, together with the block address data 20, the data reading speed can be increased. This is because perceptible information can be restored only when the block address of each block is recognized.

In other words, in the invention, the dot code is constructed such that each block header including its block address is recognized after a corresponding marker is detected. When the block header is recognized, the restoration parameter data included in the block header is recognized simultaneously. Therefore, demodulation of the data dot pattern is not necessary, which is required in the conventional case where the restoration parameter data is included in the data dot pattern. This means that the restoration parameter data can be obtained earlier than in the conventional case, whereby the data reading speed can be increased in the invention. It is a matter of course that if modulated restoration parameter data is included in the data dot pattern, the restoration parameter data cannot be obtained at the time of restoration of the data dot pattern, which makes it very difficult to achieve the object of the invention, i.e. to restore the data dot pattern.

The copy protect information which is included in the restoration parameter data will now be described. Copy of the dot code can be prohibited by including the copy protect information in the restoration parameter data in the block header section 4, and using it as a copy protect flag. More specifically, when the code reading apparatus 11 has read the dot code 1, it prohibits output of the code to a printing machine, a storage unit, etc. if the copy protect flag is "On". In other words, the apparatus 11 can prohibit output of the image data on the code to the code printer or to the data storage unit, etc.

A recording medium with a dot code, according to a second embodiment, in which a plurality of block header sections each contain an identical data item, will be described.

In the dot code on the recording medium of the second embodiment, the block header section of at least two blocks each contain an identical restoration parameter data item.

FIGS. 4A to 4C show the structure of a dot code recorded on a recording medium according to the second embodiment.

As is shown in FIG. 4A, a dot code 1 comprises a plurality of blocks 2 arranged two-dimensionally and adjacent to one another. As is shown in FIG. 4B, each block 2 comprises marker sections 5 for recognizing the block 2; a data dot pattern section 3 as a modulation area which is modulated to be structurally discriminated from the marker sections 5 and to represent modulated information, and which includes a plurality of data dots 7 arranged such that each bit value of the modulated information is represented by a corresponding dot; a block header section 4 as a non-modulation area which contains block address data indicative of the address of the block 2, and a matching dot pattern section 6.

This embodiment has, in each block header section 4, restoration parameter data 23 similar to that of the first embodiment, as is shown in FIG. 4C. At least two of block header sections 4a to 4c shown in FIG. 4A each contain an identical restoration parameter data item. For example, as shown in FIG. 4C, restoration parameter data items 23a and 23b of the block header sections 4a and 4b have the same contents. The structure of the second embodiment is not limited to this, of course.

Since in the recording medium with the dot code according to the second embodiment, an identical restoration parameter data item is contained in a plurality of block header sections, the restoration parameter data is highly reliable. Moreover, even if the restoration parameter data items which should be recorded as identical data items are restored as different data items, the actual identical restoration parameter data items can be estimated with high accuracy in light of the restoration frequency of each data item. Specifically, the reliability of information can be enhanced by processing, as restoration parameter data, data restored at a maximum frequency.

A recording medium with a dot code according to a third embodiment, in which an error correction code is attached only to block address data in each block header, will be described with reference to FIGS. 3 and 4.

In the dot code on the recording medium of the third embodiment, an error correction or detection code 24 is attached only to block address data in the block header section 4 of FIG. 3. Concerning error correction or detection, there is no limitation to a method therefor, and any publicly known method, e.g. the BCH encoding method, can be used.

Where the second and third embodiments are used simultaneously, the error correction or error detection code 24 is attached not to the identical restoration parameter data, but to the block address data only.

When the range to be covered with error correction is limited to the block address data, the function for correcting an error in the block address data can be enhanced. This means that the apparatus can have a higher resistance against errors.

A code reading apparatus, according to a fourth embodiment, for reading the dot code which has the restoration parameter data included in the block header section will be described.

The apparatus of this embodiment is used for reading the dot code on the recording medium according to the first embodiment. The basic structure of the apparatus is similar to FIG. 2, and hence no detailed explanation will be given thereof. Only a reading operation by which the apparatus is characterized will be described with reference to FIGS. 3 and 5.

Figure 5:
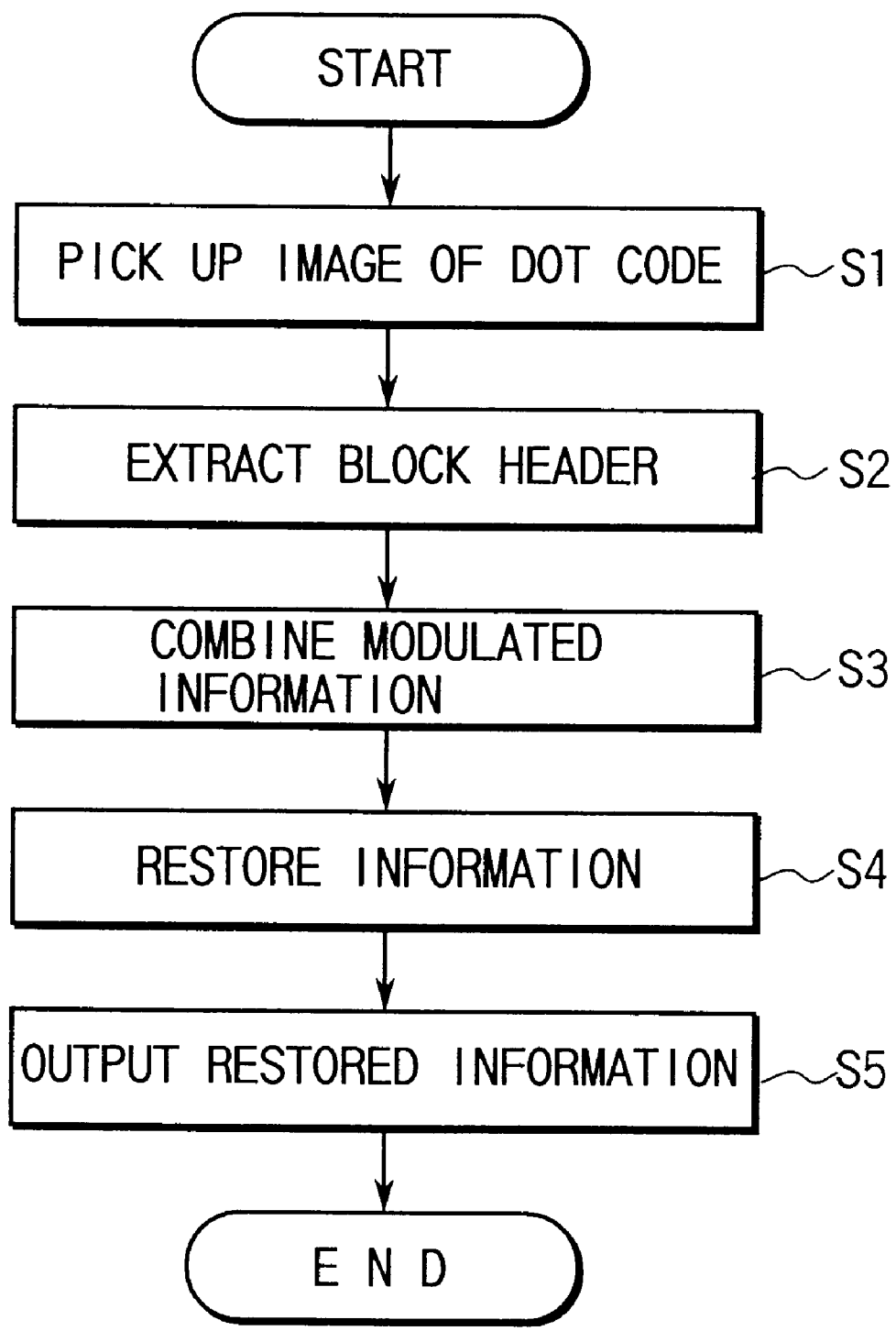
FIG. 5 is a flowchart, useful in explaining the operation of the cord reading apparatus of the invention.

Referring first to FIG. 5, a dot code 1 on a recording medium is optically picked and read (step S1), and then the block header section 4 is extracted from each block 2 of the dot code 1 (step S2). Subsequently, modulated information items in the blocks are processed and combined on the basis of the block address data 20 and the restoration parameter data 21 included in the extracted each block header section 4 (step S3), thereby restoring predetermined perceptible information (step S4). The thus-restored information is output (step S5).

Processing and combination of information items in the step S3 means to demodulate the modulated data items in the blocks on the basis of information which is included in the restoration parameter data and indicative of a modulation method, to store, in predetermined data memory areas, the demodulated data items in accordance with their addresses based on the detected block address data items of the blocks, and to combine the stored data items into information of a single perceptible unit.

The restoration parameter data necessary to restore perceptible information specifically indicates data relating to an error correction code or an error correction code length, data relating to the number of blocks included in the dot code 1, data relating to copy protect, or interleave data relating to the data dot pattern included in the modulation area, as well as data indicative of a modulation method. There is no particular limitation to the modulation method, and accordingly any voluntary modulation method can be employed. Moreover, a perceptible unit of information means the unit of information such as voice information, image information, sentence information, character information, etc., in which unit a person can visually or audibly recognize and understand the information. The perceptible unit also means a unit in which a person can clearly discriminate, for example, voice information items of the same kind but recorded at different points of time.

As described above, the code reading apparatus of the fourth embodiment processes the dot code 1 in which modulated information is recorded as a data dot pattern, the unmodulated block address data 20 and the unmodulated restoration parameter data 21 are included in the block header section 4, to restore the modulated information to predetermined perceptible information. Since the code reading apparatus does not need demodulation processing of data included in the block header section 4 of the dot code 1, it can read data at high speed. Further, since the block header section 4es unmodulated data and hence no redundancy data created as a result of modulation, all data dots of the block header section 4 can be assigned to the block address data 20 and the restoration parameter data 21, which enables accurate restoration of modulated information.

An explanation will be given of a code reading apparatus, according to a sixth embodiment, for reading a dot code printed on a recording medium (according to the first embodiment), in which modulation method data is included in the restoration parameter data of the block header section. Since the to-be-read code has the same structure as that of FIG. 4, and the basic operation of the code reading apparatus is similar to that of FIG. 5, explanation thereof is omitted and only the characteristic operation of the fourth embodiment will be described.

The code reading apparatus of the fifth embodiment is used to process a dot code 1 on a recording medium, in which the restoration parameter data includes data indicative of a modulation method applied to information. The apparatus scans the dot code 1 to read modulation method data 22 and restore the information on the basis of the modulation method data 22.

The fifth embodiment can restore any information which was modulated in various manners.

Therefore, different dot codes can be formed by different modulation methods, or blocks included in a dot code can be formed by different modulation methods. Thus, various types of dot codes can be used for various purposes, which means that the versatility of dot codes is enhanced.

An explanation will be given of a code reading apparatus, according to a fifth embodiment, for reading a dot code printed on a recording medium (according to the second embodiment), in which an identical restoration parameter data item is included in at least two block header sections. Since the to-be-read code has the same structure as that of FIG. 4, and the basic operation of the code reading apparatus is similar to that of FIG. 5, explanation thereof is omitted and only the characteristic operation of the fifth embodiment will be described.

The code reading apparatus of the sixth embodiment is disposed to read the dot code in which an identical restoration parameter data item is included in at least two block header sections 4. Specifically, the apparatus reads a dot code in which identical restoration parameter data items 23a and 23b are included in two block header sections 4a and 4b, respectively, thereby restoring modulated information included in the dot code.

The sixth embodiment in which an identical restoration parameter data item is included in at least two blocks can not only increase the reliability of output data, but also estimate, with high accuracy, actual restoration parameter data in light of the frequency of each data item, even if restoration parameter data items which should be recorded as identical data items are restored as different data items.

The invention is not limited to the above-described embodiments, but may be modulated in various manners without departing from its scope. For example, the restoration parameter data may include copy protect data, or may not be included in every block (e.g. the restoration parameter data may be included in one of each pair of blocks or in units of a predetermined number of blocks). The restoration parameter data may be recorded each time interleave processing of modulated information is performed.

The above-described embodiments support the following aspects of the invention:

(1) An optically readable dot code including a plurality of blocks arranged adjacent to each other, each block comprising: a marker section for recognizing the block; a data dot pattern section as a modulation area which is modulated to be structurally discriminated from the marker section and to represent modulated information, and which includes a plurality of dots arranged such that each bit value of the modulated information is represented by a corresponding dot; and a block header section as a non-modulation area which contains block address data indicative of an address assigned to the block; wherein the marker section, the data dot pattern and the block header section are in a predetermined arrangement; and the block header section includes restoration parameter data necessary to process modulated information represented by a data dot pattern in the data dot pattern section of the block, thereby to restore the modulated information to predetermined perceptible information.

This aspect of the invention corresponds to the first embodiment.

Since in the above-described aspect of the invention, the block address data and the restoration parameter data, which are included in the block header section, are not modulated, the data dots of the block header section include no redundancy data which will be created when modulation is performed. Accordingly, all data dots in the block header section can be assigned to the block address data and the restoration parameter data. Moreover, that the data of the block header section is not modulated means the speed of data reading can be increased.

(2) A dot code as described in item (1), characterized in that the restoration parameter data includes data relating to a predetermined modulation method applied to the modulated information.

This aspect of the invention corresponds to the first embodiment.

Accordingly, various modulation processing applied to information recorded as the dot code can also be dealt with, and hence predetermined perceptible information can accurately be restored.

(3) A dot code as described in item (1) or (2), characterized in that an identical restoration parameter data item is included in the block header sections of at least two of the blocks.

This aspect of the invention corresponds to the second embodiment.

Including an identical restoration parameter data item in the block header sections of a plurality of blocks enhances the reliability of the restoration parameter data item. Furthermore, even if the restoration parameter data items which should be recorded as identical data items are restored as different data items, the actual identical restoration parameter data items can be estimated with high accuracy in light of the restoration frequency of each data item. Specifically, the reliability of information can be enhanced by processing, as restoration parameter data, data restored at a maximum frequency.

(4) A dot code as described in item (1), characterized in that an error correction or detection code is attached only to the block address data in each block header section.

This aspect of the invention corresponds to the third embodiment.

In this dot code, the error correction or detection code is attached only to data relating to the block address data. In other words, limiting the range in which the error correction or detection code covers to the block address data enhances the block address error correction capability and hence the overall error correction capability of the apparatus.

(5) A code reading apparatus comprising: reading means for picking up and optically reading an image of a dot code as described in item (1); block header section extracting means for extracting the header block section from each block of the dot code read by the reading means; restoration means for processing the modulated information items of the blocks and combining them into predetermined perceptible information on the basis of the block address data and the restoration parameter data included in the block header section of each block extracted by the block header section extracting means; and output means for outputting the predetermined perceptible information restored by the restoration means.

This aspect of the invention corresponds to the fourth embodiment.

In the code reading apparatus, a dot code is optically picked and read by the reading means, the block header section of each block in the dot code read by the reading means is extracted by the block header extraction means, modulated information items in the blocks are processed and combined, by the restoration means, to be restored to predetermined perceptible information on the basis of the block address data and the restoration parameter data included in each block header section extracted by the block header extraction means, and the information restored by the restoration means is output by the output means.

In other words, the code reading apparatus of the invention does not need data demodulation processing of the block header section of the dot code at the time of reading the code, with the result that the data reading speed can be increased. In addition, the block header section is not modulated and all data dots are assigned to the block address data and the restoration parameter data, which means the dots can be used to the maximum and the information recorded as the data dots can be restored to predetermined perceptible information.

(6) A code reading apparatus as described in item (5), characterized in that the restoration parameter data includes data relating to a predetermined modulation method applied to the modulated information.

This aspect of the invention corresponds to the fifth embodiment.

Restoration parameter data in a dot code to be read by the code reading apparatus includes data indicative of a modulation method applied to information included in the dot code.

The code reading apparatus can accurately restore, to predetermined perceptible information, information modulated in any voluntary modulation method and recorded as data dots, by extracting data which is included in restoration parameter data in the block header section of a dot code and indicates the modulation method.

(7) A code reading apparatus as described in item (5) or (6), characterized in that an identical restoration parameter data item is included in the block header sections of at least two of the blocks.

This aspect of the invention corresponds to the sixth embodiment.

The block header sections of at least two of the blocks of a dot code to be read by the code reading apparatus contains an identical restoration parameter data item.

The code reading apparatus of this embodiment can restore, to predetermined perceptible information, information recorded as data dots, by extracting the identical restoration parameter data item included in the at least two blocks of the dot code.

Thus including the identical restoration parameter data item in the block header sections of the plural blocks enhances the reliability of the restoration parameter data item. Even when the restoration parameter data items which should be recorded as identical data items are extracted as different data items, it suffices if that one of the extracted restoration parameter data items which was extracted at maximum frequency is used as the actual restoration parameter data.

As described in detail, the present invention provides a recording medium with a dot code as an optically readable code pattern, which represents information relating to multimedia information, and in which code the information can be modulated by various modulation methods. The invention also provides a code reading apparatus capable of restoring the modulated information recorded as the dot code.

What is claimed is:

1. An optically readable dot code including a plurality of blocks arranged adjacent to each other, each block comprising:
   a marker section for recognizing the block,
   a data dot pattern section as a modulation area which is modulated to be structurally discriminated from the marker section and to represent modulated information, and which includes a plurality of dots arranged such that each bit value of the modulated information is represented by a corresponding dot; and
   a block header section as a non-modulation area which contains block address data indicative of an address assigned to the block;
   wherein the marker section, the data dot section and the block header section are positioned in a predetermined arrangement with respect to each other; and
   wherein, in addition to the block address data, the block header section further includes (i) information indicative of a modulation method applied to the modulated information represented by the data dot pattern section of the block, and (ii) restoration parameter data necessary to process the modulated information to restore the modulated information to predetermined perceptible information.

2. A dot code according to claim 1, wherein the block header section of each of the blocks includes identical information indicative of the modulation method.

3. A dot code according to claim 1, wherein one of an error correction and a detection code for the block address data is attached to the block header section of each of the blocks.

4. A code reading apparatus comprising:
   reading means for picking up and optically reading an image of an optically readable dot code including a plurality of blocks arranged adjacent to each other, each block comprising (i) a marker section for recognizing the block, (ii) a data dot pattern section as a modulation area which is modulated to be structurally discriminated from the marker section and to represent modulated information, and which includes a plurality of dots arranged such that each bit value of the modulated information is represented by a corresponding dot, and (iii) a block header section as a non-modulation area which contains block address data indicative of an address assigned to the block, wherein the marker section, the data dot pattern and the block header section are positioned in a predetermined arrangement with respect to each other;
   block header section extracting means for extracting the block address data contained in the block header section from each block of the dot code read by the reading means;
   restoration means for processing the modulated information represented by the data dot pattern section of each block of the dot code read by the reading means, and for combining the processed modulated information into predetermined perceptible information based on the block address data extracted by the block header section extracting means; and
   output means for outputting the predetermined perceptible information obtained by the restoration means;
   wherein, in addition to the block address data, the block header section of each block further includes (i) information indicative of a modulation method applied to the modulated information represented by the data dot pattern section of the block, and (ii) restoration parameter data necessary to process the modulated information to restore the modulated information to the predetermined perceptible information;
   wherein the block header section extracting means further extracts the information indicative of the modulation method, in addition to the block address data; and
   wherein the restoration means demodulates the modulated information represented by the data dot pattern section of each block of the dot code read by the reading means based on the information indicative of the modulation method which has been extracted by the block header section extracting means, and restores the predetermined perceptible information based on the block address data extracted by the block header section extracting means.

5. A code reading apparatus according to claim 4, wherein the block header section of each of the blocks includes identical information indicative of the modulation method.

6. An optically readable dot code comprising:
   a marker section for enabling the dot code to be recognized;
   a data dot pattern section as a modulation area which is modulated to be structurally discriminated from the marker section and to represent modulated information, and which includes a plurality of dots arranged such that each bit value of the modulated information is represented by a corresponding dot; and
   a header section as a non-modulation area which contains (i) information indicative of a modulation method applied to the modulated information represented by the data dot pattern section, and (ii) restoration-parameter data necessary to process the modulated information to restore the modulated information to predetermined perceptible information.

7. A code reading apparatus comprising:
   reading means for picking up and optically reading an image of an optically readable dot code, comprising (i)

a marker section for enabling the dot code to be recognized, and (ii) a data dot pattern section as a modulation area which is modulated to be structurally discriminated from the marker section and to represent modulated information, and which includes a plurality of dots arranged such that each bit value of the modulated information is represented by a corresponding dot, wherein the marker section and the data dot pattern are positioned in a predetermined arrangement with respect to each other;

restoration means for processing the modulated information and producing predetermined perceptible information, based on the dot code read by the reading means; and output means for outputting the predetermined perceptible information obtained by the restoration means;

wherein the dot code further comprises a header section as a non-modulation area which contains (i) information indicative of a modulation method applied to the modulated information, and, (ii) restoration parameter data necessary to process the modulated information to restore the modulated information to the predetermined perceptible information; and wherein the restoration means demodulates the modulated information based on the information indicative of the modulation method.

* * * * *

UNITED STATES PATENT AND TRADEMARK OFFICE
CERTIFICATE OF CORRECTION

Page 1 of 1

PATENT NO. : 6,186,405 B1
DATED : February 13, 2001
INVENTOR(S) : Kenji Yoshioka It is certified that error appears in the above-identified patent and that said Letters Patent is hereby corrected as shown below:

Item [54],
Title, change "DOT CODE AND CODE READING APPARATUS" to
-- TWO-DIMENSIONAL DOT CODE HAVING A PLURALITY OF BLOCKS AND READING APPARATUS USING THE SAME --;

Item [56],
References Cited, under "FOREIGN PATENT DOCUMENTS", insert
-- 7-254037    10/1995    (JP). --.

Signed and Sealed this

Fifteenth Day of January, 2002

Attest:

JAMES E. ROGAN
Director of the United States Patent and Trademark Office

Attesting Officer